United States Patent
Wilcoxson

(10) Patent No.: US 7,584,297 B1
(45) Date of Patent: Sep. 1, 2009

(54) SOFT DIVERSITY SATELLITE GATEWAY ARCHITECTURE

(75) Inventor: Donald C. Wilcoxson, Oceanside, CA (US)

(73) Assignee: ViaSat, Inc., Carlsbad, CA (US)

( * ) Notice: Subject to any disclaimer, the term of this patent is extended or adjusted under 35 U.S.C. 154(b) by 668 days.

(21) Appl. No.: 10/256,872

(22) Filed: Sep. 26, 2002

(51) Int. Cl.
*G06F 15/173* (2006.01)
*H04W 4/00* (2009.01)

(52) U.S. Cl. ................................. 709/238; 455/427
(58) Field of Classification Search ............... 709/224, 709/225, 226, 238; 455/3.02, 13.2, 427
See application file for complete search history.

(56) References Cited

U.S. PATENT DOCUMENTS

| | | | | |
|---|---|---|---|---|
| 4,099,121 A * | 7/1978 | Fang | ............................ | 375/267 |
| 4,287,598 A * | 9/1981 | Langseth et al. | ............ | 455/505 |
| 5,345,599 A * | 9/1994 | Paulraj et al. | ............... | 455/500 |
| 5,471,474 A * | 11/1995 | Grobicki et al. | ............ | 370/437 |
| 5,590,395 A * | 12/1996 | Diekelman | .................. | 455/13.1 |
| 6,041,233 A * | 3/2000 | Rosati | ......................... | 455/427 |
| 6,069,872 A * | 5/2000 | Bonomi et al. | ............... | 370/236 |
| 6,148,179 A * | 11/2000 | Wright et al. | ............... | 455/66.1 |
| 6,366,761 B1 * | 4/2002 | Montpetit | .................. | 455/12.1 |
| 6,473,793 B1 * | 10/2002 | Dillon et al. | ................. | 709/223 |
| 6,567,645 B1 * | 5/2003 | Wiedeman et al. | .......... | 455/12.1 |
| 6,587,687 B1 * | 7/2003 | Wiedeman | ................... | 455/428 |
| 2003/0032391 A1 | 2/2003 | Schweinhart et al. | | |

* cited by examiner

*Primary Examiner*—Andrew Caldwell
*Assistant Examiner*—Bradford F Fritz
(74) *Attorney, Agent, or Firm*—Townsend and Townsend and Crew LLP; Kenneth R. Allen

(57) ABSTRACT

Methods and systems are provided for satellite communication wherein a plurality of geographically-separated apertures are controlled by a central controller that analyzes link availability of each aperture and then user connectivity is prioritized above a minimum user data rate, whereupon the gateway-established data rate of lower priority users is reduced to allocate more capacity to highest priority users, which are routed through available links in order to better optimize a gateway architecture, to reduce gateway costs and to improve effective performance in the presence of atmospheric interference events.

12 Claims, 5 Drawing Sheets

SOFT DIVERSITY SATELLITE GATEWAY ARCHITECTURE

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to satellite ground station antenna deployment in connection with any star topology, wherein the gateway (or hub) is subject to significant losses due to atmospheric conditions (e.g., rain) or is in need of high or very high link availability (where link availability can be defined at all possible data rates/modulations/coding combinations. However, for purposes of this discussion one can assign an overall availability that is tied to the lowest acceptable data rate combination).

Maintaining gateway link availability at a suitably high-level for transmission and reception in the higher satellite frequency bands, such as Ka-band, is challenging, especially where detrimental atmospheric conditions exist, such as in high rain-rate regions. A traditional approach is to provide a second, geographically separated gateway to serve as a diversity site for use when the primary site is unusable due to a rain (or other interfering) event. Another approach is to provide a single gateway with a very large link margin, specifically enough to maintain the link availability across expected rain events. However, this large link margin approach can be impractical for many areas of the world at Ka-band and other higher satellite frequency bands. For applications requiring the maintenance of a given data rate to all users at all times, only limited types of approaches are useable. However, for data-centric services where many users are supported with user-addressed data, it is possible to consider scenarios where the data rate emanating from the gateway can be reduced in the event of the rain fade, without a significant apparent reduction in service to the users. What is needed is a method and system for improving the robustness of satellite communication channels at a low cost without unduly slowing communications.

SUMMARY OF THE INVENTION

According to the invention, methods and systems are provided for satellite communication wherein a plurality of geographically-separated antenna apertures (e.g., satellite signal transmitting and/or receiving nodes) are controlled by a central controller that analyzes link availability of each aperture and then user connectivity is prioritized above a minimum user data rate, whereupon the gateway-established data rate for lower priority users is reduced to allocate more capacity to highest priority users, whose data are routed through available links. This better optimizes the gateway architecture, reduces gateway costs and improves effective performance in the presence of communication impairments such as atmospheric interference events, physical calamities or the like.

In many Ka-band systems where a user equipment terminal has very little excess margin itself, even without taking into account a rain event at a gateway, the data rate must be reduced in order to maintain connectivity. Since this is likely to occur often at the user equipment terminal (due to rain or other events), and since the gateway (GW) rate addressed to that user would have to be reduced in this condition, a similar reduction of the gateway rate might be acceptable in circumstances where rain events affect the gateway. In either case, the user equipment terminal maintains its connectivity to the network.

In the case of a multi-channel uplink (for example, 500 MHz split into four channels, 125 MHz wide, each carrying a single modulated signal), a single gateway is faced with either multi-carrier operation through a single high-power amplifier (HPA), combining the four signals to transmit through a single aperture, or with use of four separate apertures. Transmitting two of the channels through one aperture and the other two through a second aperture makes the combining loss significantly less, since the channels to be combined can be spaced wider apart in frequency. Additionally, for operation through a single HPA at each of the two apertures, the HPA backoff can be significantly less since two carriers need not be backed off to the same degree as four carriers. Since two apertures are used, site diversity is more tenable and can be utilized to advantage.

The invention is useful in areas where the location of the hub is in a high rain-rate region or needs extremely high availabilities (i.e., above 99.9%). A specific application is a configuration where the data rate of information leaving the gateway is variable by nature (i.e., not fixed rate television broadcast for example), as for example in a two-way data service, although applications are not limited to that service. This approach could apply to any gateway not specifically tied to any modulation/coding type (with the exception of variable data rate utilizing a single modulation/coding type.)

The invention will be better understood with reference to the following detailed description in connection with the accompanying drawings.

DETAILED DESCRIPTION OF THE INVENTION

Figure 1:
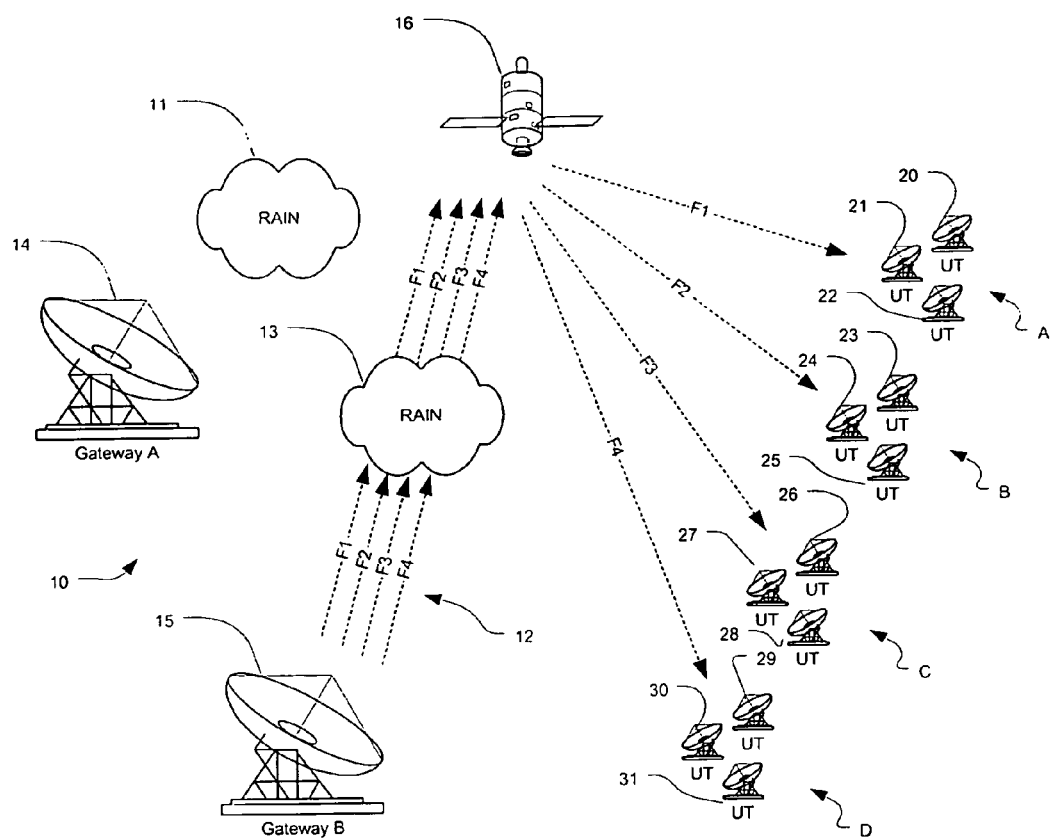
FIG. 1 is a block diagram of a gateway architecture of the prior art.

A multi-channel diversity gateway architecture 10 is shown in FIG. 1. Return links exist but are not shown. Only one direction of the links is shown, since the concern of the present invention is the effects 11, 13 that degrade the link 12 between the gateways 14, 15 and the satellite 16. In FIG. 1, the gateways 14, 15 alternatively communicate with a number of user terminals (UT) 20-31 using a number of channels (in this example, four channels on frequencies F1 to F4 paired to F1' to F4'). The users are separated into groups A-D, each group sharing their common channel in some way (e.g., time division multiplexing). The users may be placed into channels for various reasons. Terminals may not actually be physically close to others in the same channel group.

In order to maintain high availability, a gateway diversity scheme is implemented as shown in FIG. 1. Two gateways 14, 15 with identical capabilities are deployed, far enough apart from each other that it is unlikely that both experience heavy rain at the same time. (Rain is discussed since it is the primary impairment, although the invention applies equally to other impairments that may cause a site to be inoperable.) Any number of gateways may be deployed, but two are shown for convenience. In the prior art, only one gateway 14 or 15 carries the entire load for the system 10 at any given time, typically the gateway with the best uplink capability. For example, where both gateways 14, 15 experience heavy rain 11, 13, the best available connection is a degraded link 12 through Gateway B.

At least a controller (not shown) must be implemented to control the two gateways and direct all traffic through the single active gateway.

Figure 2:
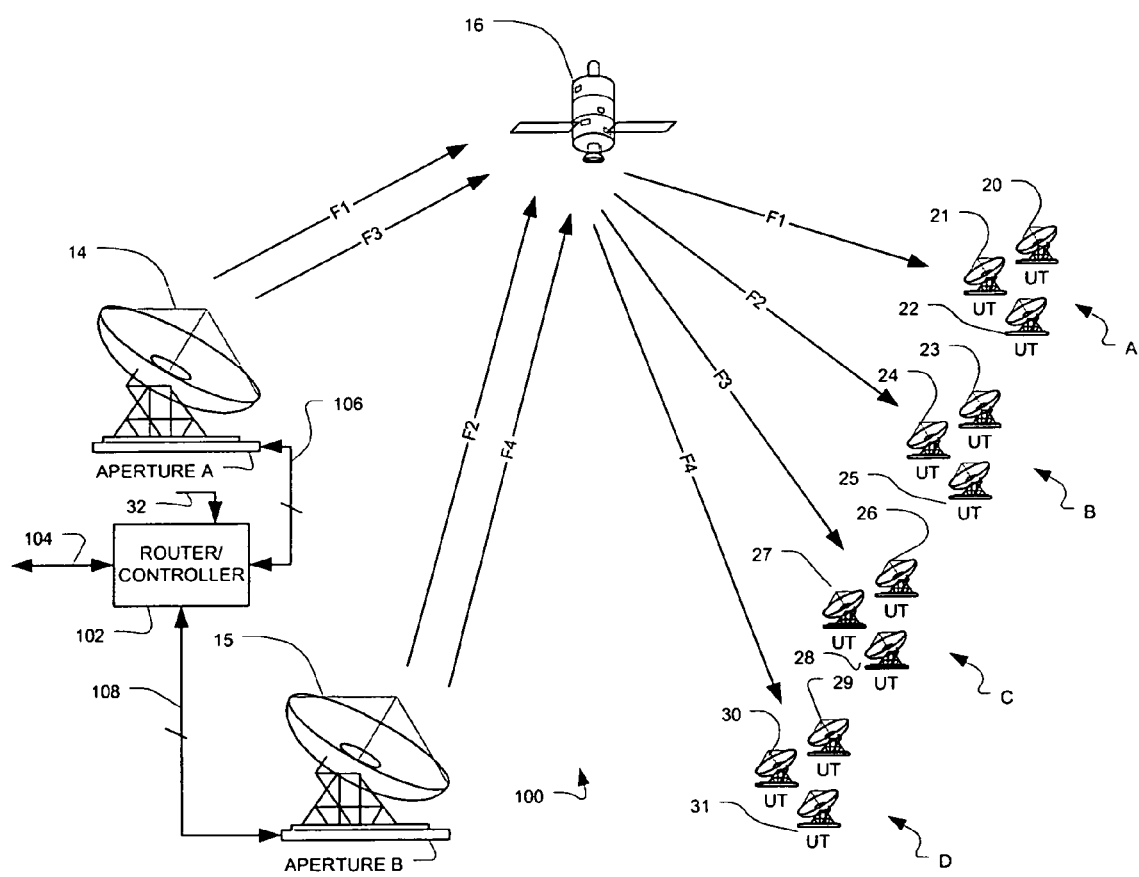
FIG. 2 is a block diagram of the gateway architecture according to the invention using a split aperture gateway.

Referring to FIG. 2, a gateway diversity system 100 according to the invention provides at least two aperture elements at diverse sites wherein the gateway function is split into parts, each site performing some fraction of the total function. In this embodiment, the first site is Aperture A, which handles the signals on frequency bands F1 and F3. The second site is Aperture B, which handles the signals on frequency bands F2 and F4. A controller 102 is provided which controls data rate and frequency allocation between Aperture A 14 and Aperture B 15, in response to a feedback signal 32 on a return channel (not shown) which indicates the quality of signal in the presence of rain or the like. The user terminals 20-31 are frequency agile. There are no static frequency assignments. Each UT 20-31 has in it a built-in scanning function, whereby it senses an appropriate frequency F1'-F4' and handshakes with the selected gateway having the more suitable available channel F1-F4. (F1' is the downlink channel corresponding to the uplink channel F1, etc.) The controller 102 receives control and information via signal path 104 and communicates control and information signals to the apertures 14, 15 via connections 106, 108, thereby serving as a switching function. The controller 102 may be located adjacent either one of the apertures A 14 or B, 15 or at a third location convenient to all apertures.

Figure 3A:
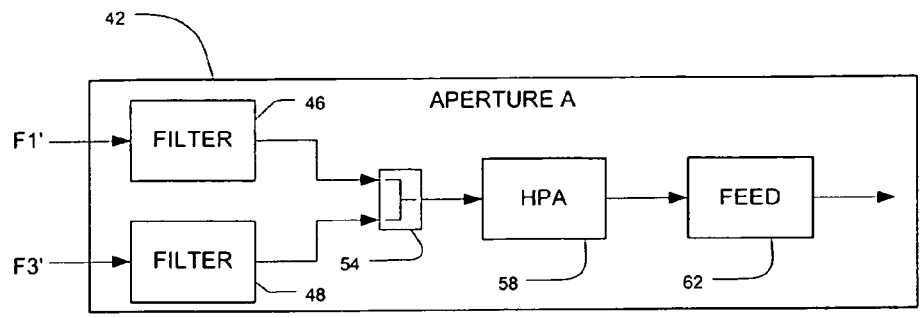
FIG. 3A is a block diagram of the transmit circuitry of a first aperture.
Figure 3B:
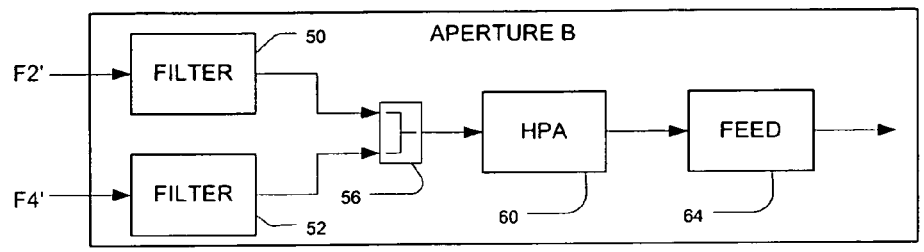
FIG. 3B is a block diagram of the transmit circuitry of a second aperture.

Referring to FIG. 3A and FIG. 3B, at each aperture 14, 15 there is a set of similar but not identical circuits 42, 44 for processing signals. For each frequency there is a bandpass filter 46, 48, 50, 52. Paired outputs are combined in pairs in combiners 54, 56 having a corresponding set of input ports. This configuration provides better performance, typically having a combination loss of about 3 dB better than a four-port combiner. The output of each combiner 54, 56 is fed to a high-power amplifier (HPA) 58, 60 and thence to the feed or transmit circuitry 62, 64 of the respective apertures 14, 15. A two-aperture configuration may be used at a single site gateway merely for this 100% performance gain. Once the signal is separated into two apertures, those two apertures A and B can be geographically separated to get a diversity gain, an important advantage of this configuration.

Figure 4:
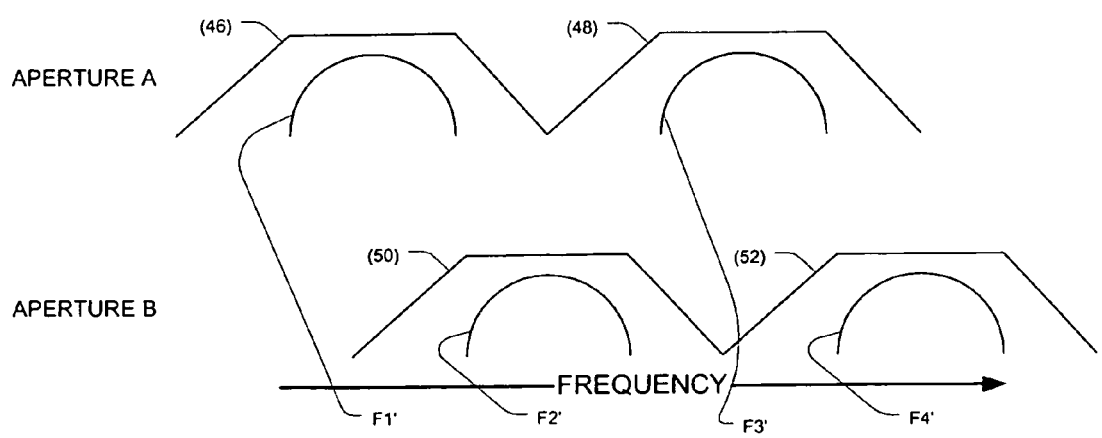
FIG. 4 is a block diagram of the frequency allocation of respective apertures.

FIG. 4 is a frequency plan showing filter characteristics for a general multiple aperture implementation, illustrated with two apertures. Aperture A has filter characteristics 46 and 48 for frequencies F1 and F3. Aperture B has filter characteristics 50 and 52 for frequencies F2 and F4. The apertures have channels that do not take adjacent frequencies, so the filters 46, 48, 50, 52 can have much less rigorous rolloff, yielding better performance at a lower cost.

Figure 5:
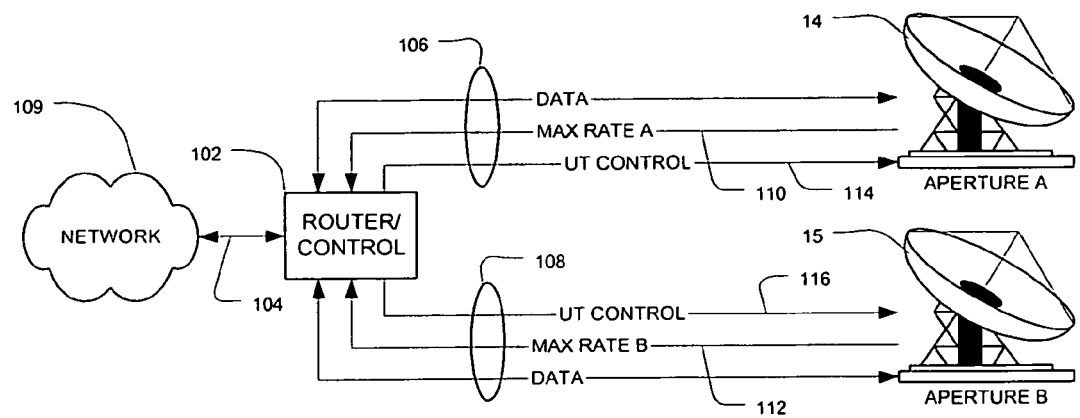
FIG. 5 is a block diagram of a controller/router configuration.

Two sample techniques for implementing the gateway according the invention are described. A first embodiment is shown in FIG. 5. In this embodiment, a central router and controller 102 handles all data from the network 109 (voice, data, internet, intranet, etc.) to the UTs via paths 104, 106, and 108. Each aperture reports its current maximum rate to the controller via lines 110 and 112. The controller 102 uses these reports and other information (network traffic load, service guarantees, weather forecasts, etc.) to route traffic and generate control messages for the UTs via paths 114 and 116 so that they are transmitted by the appropriate aperture 14 or 15. The router/controller 102 is typically collocated with one of the apertures. A router/controller scheme could be implemented at ALL apertures in a hot spare capacity, with the resultant increase in cost.

Figure 6:
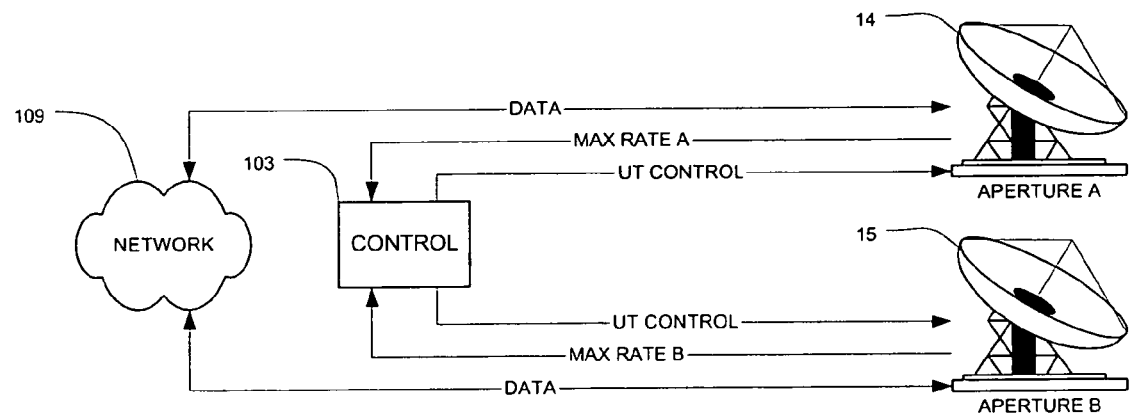
FIG. 6 is a block diagram of a controller configuration.

A second embodiment is shown in FIG. 6. Here each aperture 14, 15 maintains its own datapath connection to the network 109 that is serving the UTs. A controller 103 in this case does not route data between the network 109 and the apertures 14, 15. Instead, the controller 103 switches user terminals to the appropriate channel based on the current conditions. This system requires less communication among the apertures, but it must either monitor data traffic or suffer performance degradation because of the inability to monitor the data traffic.

Figure 7:
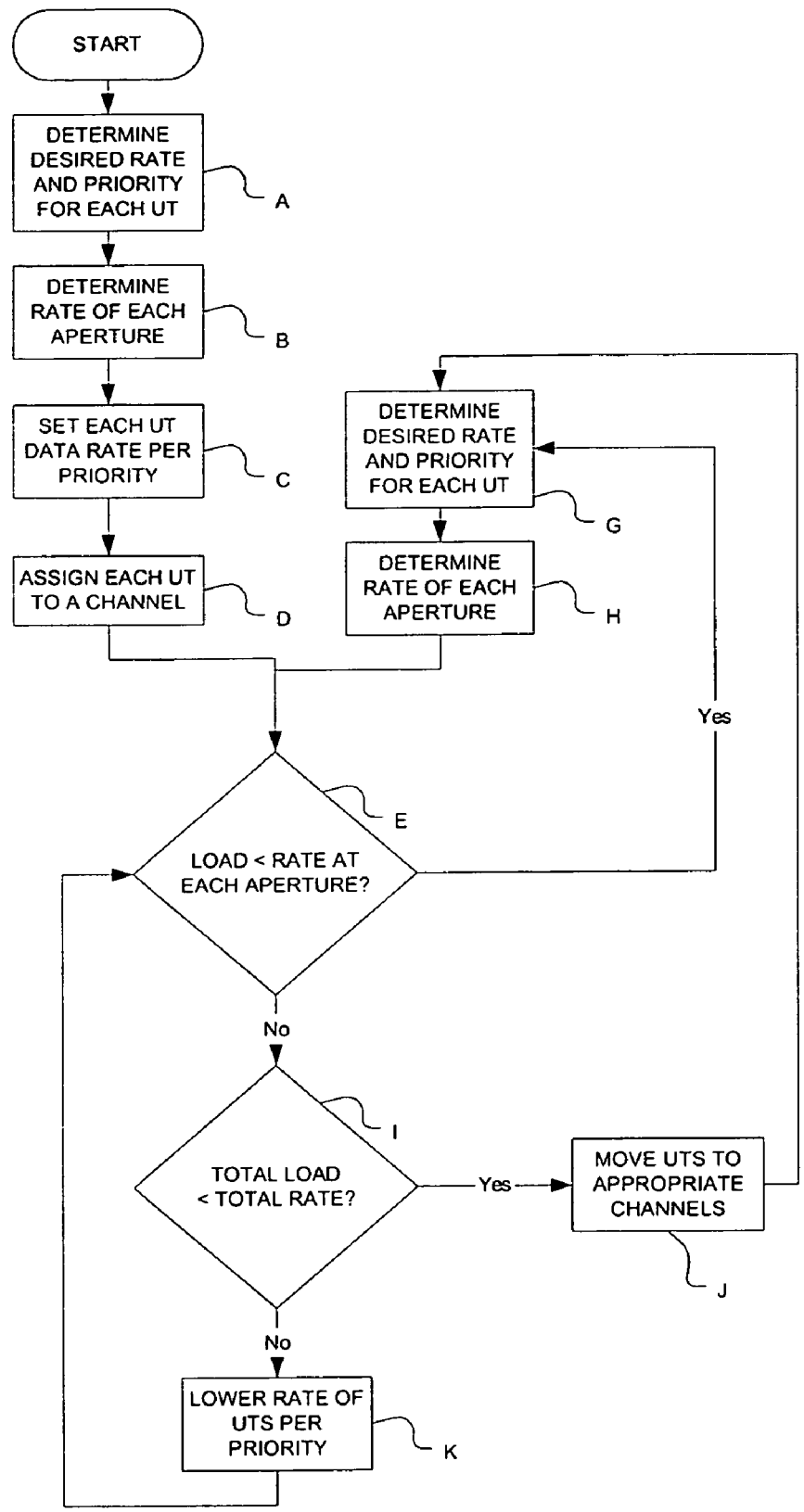
FIG. 7 is a flow chart illustrating routing functions according to the invention.

FIG. 7 is a flow chart illustrating operation of this invention. The controller first determines a desired rate and priority for each UT (Step A). This may be as simple as responding to priority requests made by the UT and a ranking of priority. The maximum possible data rate transmitted at each aperture is then determined, typically by a simple measurement algorithm (Step B) (The GW knows what it is currently transmitting, which is typically its maximum possible, although there may be sound reasons to transmit at lower rates). The controller then sets the data rate of each UT according to assigned priority (Step C), and assigns each UT to a particular channel, since each UT is assumed to be frequency agile (Step D). The controller then tests the load at each aperture to determine if the load is less than the rate at each aperture (Step E). If the load is less than the rate at each aperture, then the controller determines the desired rate and priority of each UT (Step G) and then determines the rate at each aperture (Step H). This can be an incremental iterative process to balance the load and the rate. If the load is greater than the rate at each aperture, the controller tests to see if the total load is less than the total rate or capacity of the system (Step I). If the total load is less than the total rate, then the UTs are reassigned to appropriate channels (e.g., according to available rate capacity) (Step J). Otherwise, the controller lowers the assigned rate of the UTs according to priority (to increase capacity for higher priority traffic) (Step K) in an iterative process, wherein the load is again tested against rate at each aperture (Step E).

Consider the situation where one aperture (Aperture A) is completely blocked by heavy rain. In this case, referring to FIG. 2, the router/controller 102 senses channel availability and divides all the users among the two available frequencies F1 and F3 serviced by the clear aperture, namely aperture A 14. This will not be an outage incident if the system is loaded to less than half of its capacity.

The router/controller 102 applies selected criteria to determine when to allocate users to other channels. Using the ITU (International Telecommunications Union) rain model ITU-R P.618-7, and for simplicity considering only rain attenuation predicted in the model, and considering three sites, New York City (Latitude 40.7°, 0.01% annual rainfall 42 mm/hr), Miami (FL; Latitude 25.8°, 0.01% annual rainfall 95 mm/hr), and Kuala Lumpur (Latitude 3.1°, 0.01% annual rainfall 145 mm/hr), one can determine link availabilities under a given set of conditions. Only uplink availabilities are illustrated. However, this analysis can be extended to downlink availabilities as well.

According to the invention, using soft diversity of two geographically separated sites, each site is provided with a capacity somewhat smaller than a single-site or a full diversity aperture configuration, due to the fact that each aperture has the capability of carrying only half the bandwidth and data rate. Specifically, each site is capable of carrying 250 Mb/s in 250 MHz, which nominally means assigning two carriers to each site employed in a multiple-aperture gateway function. Since only two carriers are powered by each site, more power is available for each carrier (i.e., a reduction from four to two carriers per site means 3 dB more power per carrier). In this scenario, both sites are up and running at all times. In the case where one site experiences an outage, users are transferred by the router/controller 102 to the other site if bandwidth is available. If no bandwidth is available, users are allocated less bandwidth to make room for those needing to be accommodated at the second site. No priority is assumed for any particular user. The following analysis looks at maximum possible aggregate data rate, and not with respect to any particular user or particular loading scenario (when system is not fully loaded), thus these assumptions do not make any difference in the results shown.

Consider the following variables:

$R_{full}$=full data rate capability for the GW function (information rate—500 Mb/s as defined above)

$R_{half}$=half of the full data rate capability for the GW function (information rate—250 Mb/s as defined above)

$r_{full}$=full data rate capability for a single channel (e.g., 125 MHz) (information rate—125 Mb/s as defined above)

$r_{half}$=half of the full data rate capability for a single channel (information rate—62.5 Mb/s)

X=Δ of the $E_b/N_o$ required to maintain the data rate between $r_{full}$ and $r_{half}$ (in dB; for an example code, 3 dB advantage comes from the change in data rate, and another 1.6 dB (coding gain) comes from the change in error control coding)

Y=Δ of the signal power required to maintain the data rate between GW transmitting all signals through one aperture, versus on transmitting ½ through each of two apertures. (i.e., the difference in combining loss between the two cases or HPA backoff, in dB; for example, HPA backoff may need to be 5 dB for 4 carriers, but only 2 dB for 2 carriers in order to meet intermodulation specs, thus Y=3 dB in this case)

$M_{UL}$ amount of excess margin for an single GW aperture, above what's minimally needed to close the uplink (i.e., achieve the desired C/No) at the full data rate in clear sky (i.e., for a single aperture, amount above what's needed to maintain $R_{full}$ ($r_{full}$×4); for two apertures transmitting ½ rate each, amount above what's needed to maintain $R_{half}$($r_{full}$×2) at each aperture, in dB)

$\rho_{full,1}$=unavailability for a single-site at full data rate (500 Mb/s=4, 125 Mb/s carriers)

$\rho_{half,1}$=unavailability for a single-site at half the full data rate (250 Mb/s=4, 62.5 Mb/s carriers)

$\rho_{full,2}$=unavailability for a soft diversity site (GW function configuration C) at full data rate (250 Mb/s=2, 125 Mb/s carriers)

$\rho_{half,2}$=unavailability for a soft diversity site (GW function configuration C) at half the full data rate (125 Mb/s=2, 62.5 Mb/s carriers)

$\rho_{full,1,c}$=unavailability for a full diversity site at full data rate (500 Mb/s=4, 125 Mb/s carriers), given that the other site is unavailable ($\rho_{full,1} \leq \rho_{full,1,c} \leq 100\%$; where the lower bound means there is no correlation between the sites, the upper bound means they are fully correlated, but the actual value depends on geographic separation and local rain statistics. NOTE: If it is possible to have a negative correlation between sites, i.e., less likely to have a rain outage at one site, given rain outage at the first site, then the lower bound is actually lower than $\rho_{full,1}$).

$\rho_{half,1,c}$=unavailability for a full diversity site at half the full data rate (250 Mb/s=4, 62.5 Mb/s carriers), given that the other site is unavailable at half the full data rate ($\rho_{half,1} \leq \rho_{half,1,c} \leq 100\%$; where the lower bound means there is no correlation between the sites, the upper bound means they are fully correlated, but the actual value depends on geographic separation and local rain statistics. (Further, the upper bound cannot be independent of the value of $\rho_{full,1,c}$) (NOTE: same comment as in $\rho_{full,1,c}$ applies here.)

$\rho_{full,2,c}$=unavailability for a soft diversity site at full data rate (250 Mb/s=2, 125 Mb/s carriers), given that the other site is unavailable ($\rho_{full,2} \leq \rho_{full,2,c} \leq 100\%$; where the lower bound means there is no correlation between the sites, the upper bound means they are fully correlated, but the actual value depends on geographic separation and local rain statistics. NOTE: same comment as in $\rho_{full,1,c}$ applies here.)

$\rho_{half,2,c}$=unavailability for a soft diversity site at half the full data rate (125 Mb/s=2, 62.5 Mb/s carriers), given that the other site is unavailable at half the full data rate ($\rho_{half,2} \leq \rho_{half,2,c} \leq 100\%$; the lower bound means there is no correlation between the sites, the upper bound means they are fully correlated, but the actual value depends on geographic separation and local rain statistics (also, the upper bound cannot be independent of the value of $\rho_{full,2,c}$). (NOTE: same comment as in $\rho_{full,1,c}$ applies here.)

Consider the following scenarios (with all cities at 0 km height with respect to mean sea level (MSL) operating at 29.1 GHz):

1) Single-aperture, single-site, no diversity, $M_{UL}$=2 dB for $R_{full}$, consider availability at data rate=$R_{full}$ (500 Mb/s, split among 4 carriers). In this case, the uplink availability is taken directly from the ITU rain model (=1-$\rho_{full,1}$).

| Location | $M_{UL}$ | Elev. Angle | Uplink Availability |
|---|---|---|---|
| NYC | 2 dB | 40° | 98.12% |
| Miami, FL | 2 dB | 40° | 96.13% |
| Kuala Lumpur | 2 dB | 40° | 97.03% |

2) Single-aperture, 2-site full-diversity, $M_{UL}$=2 dB for $R_{full}$, consider availability at data rate=$R_{full}$ (including fully redundant diversity site). In this case, the uplink availability is given by 1-($\rho_{full,1} \cdot \rho_{full,1,c}$).

| Location | $M_{UL}$ | Elev. Angle | Uplink Availability (no correlation, $\rho_{full,1,c} = \rho_{full,1}$) | Uplink Availability ($\rho_{full,1,c}$ = 25%) |
|---|---|---|---|---|
| NYC | 2 dB | 40° | 99.965% | 99.530% |
| Miami, FL | 2 dB | 40° | 99.850% | 99.033% |
| Kuala Lumpur | 2 dB | 40° | 99.912% | 99.258% |

3) Single-aperture, single-site, no diversity, $M_{UL}$=2 dB (for $R_{full}$ operation), consider availability at data rate=$R_{half}$, where X=4.6 dB (3 dB from information rate change, given same baud rate, 1 dB from use of a more powerful FEC assumed). In this case, the uplink availability is taken directly from the ITU rain model (using attenuation=2+4.6=6.6 dB), and is $1-\rho_{half,1}$.

| Location | $M_{UL}$ | X | Elev. Angle | Uplink Availability |
|---|---|---|---|---|
| NYC | 2 dB | 4.6 dB | 40° | 99.72% |
| Miami, FL | 2 dB | 4.6 dB | 40° | 98.62% |
| Kuala Lumpur | 2 dB | 4.6 dB | 40° | 98.33% |

4) Single-aperture, 2-site full-diversity, $M_{UL}$=2 dB (for $R_{full}$ operation), consider availability at data rate=$R_{half}$, where X=4.6 dB. In this case, the uplink availability is given by $1-(\rho_{half,1} \cdot \rho_{half,1,c})$.

| Location | $M_{UL}$ | X | Elev. Angle | Uplink Availability (no correlation, $\rho_{half,1,c} = \rho_{half,1}$) | Uplink Availability ($\rho_{half,1,c}$ = 25%) |
|---|---|---|---|---|---|
| NYC | 2 dB | 4.6 dB | 40° | 99.9992% | 99.930% |
| Miami, FL | 2 dB | 4.6 dB | 40° | 99.981% | 99.655% |
| Kuala Lumpur | 2 dB | 4.6 dB | 40° | 99.972% | 99.583% |

5) Two-aperture, 2-site (i.e., soft diversity), $M_{UL}$=2 dB (for $R_{half}$ at each site, i.e. $r_{full} \times 2$ at each site), consider the availability of data rate=$R_{full}$, where X=0 dB (i.e., apertures are sized smaller for ½ rate operation), Y=3 dB (i.e., combining loss is 3 dB less or power available due to use of two amplifiers is 3 dB more, etc.). In this case, the uplink availability is given by $1+(\rho_{full,2} \cdot \rho_{full,2,c}) - 2\rho_{full,2}$. (Here $\rho_{full,2}$ is the unavailability from the ITU rain model for 2+3=5 dB).

| Location | $M_{UL}$ | X | Y | Elev. Angle | Uplink Availability (no correlation, $\rho_{full,2,c} = \rho_{full,2}$) | Uplink Availability ($\rho_{full,2,c}$ = 25%) |
|---|---|---|---|---|---|---|
| NYC | 2 dB | 0 dB | 3 dB | 40° | 99.089% | 99.201% |
| Miami, FL | 2 dB | 0 dB | 3 dB | 40° | 96.328% | 96.757% |
| Kuala Lumpur | 2 dB | 0 dB | 3 dB | 40° | 96.110% | 96.563% |

6) Two-aperture, 2-site, $M_{UL}$=2 dB (for $R_{half}$ at each site), consider availability for data rate=$R_{half}$, where X=4.6 dB (i.e. apertures are sized smaller for ½ rate operation, but X is available for each aperture to drop to ½ its max rate (=¼ total max gateway function rate)), Y=3 dB (i.e., combining loss is 3 dB less or power available due to use of two amplifiers is 3 dB more, etc.). In this case, the uplink availability is given by $1-((\rho_{half,2} \cdot \rho_{half,2,c}) - 2\rho_{half,2} \cdot (\rho_{full,2,c} - \rho_{full,2,c}))$. (Here $\rho_{half,2}$ is the unavailability from the ITU rain model for 2+3+4.6=9.6 dB).

| Location | $M_{UL}$ | X | Y | Elev. Angle | Uplink Availability (no correlation, $\rho_{half,2,c} = \rho_{half,2}$; $\rho_{full,2,c} = \rho_{full,2}$) | Uplink Availability ($\rho_{half,2,c}$ = 25%;) |
|---|---|---|---|---|---|---|
| NYC | 2 dB | 4.6 dB | 3 dB | 40° | 99.9989% | 99.964% |
| Miami, FL | 2 dB | 4.6 dB | 3 dB | 40° | 99.976% | 99.786% |
| Kuala Lumpur | 2 dB | 4.6 dB | 3 dB | 40° | 99.966% | 99.677% |

7) Two-aperture, 2-site, $M_{UL}$=5 dB (for $R_{half}$ at each site), consider availability for data rate=$R_{full}$, where X=0 dB (i.e., apertures are sized similarly to the full diversity sites in terms of power, of course, only two carriers per site, instead of 4, thus the higher excess margin), Y=3 dB (i.e., combining loss is 3 dB less or power available due to use of two amplifiers is 3 dB more, etc.) (each site transmits maximum of half the rate, i.e. $R_{half}$)

| Location | $M_{UL}$ | X | Y | Elev. Angle | Uplink Availability (no correlation, $\rho_{full,2,c} = \rho_{full,2}$) | Uplink Availability ($\rho_{full,2,c}$ = 25%) |
|---|---|---|---|---|---|---|
| NYC | 5 dB | 0 dB | 3 dB | 40° | 99.600% | 99.650% |
| Miami, FL | 5 dB | 0 dB | 3 dB | 40° | 97.830% | 98.091% |
| Kuala Lumpur | 5 dB | 0 dB | 3 dB | 40° | 97.074% | 97.420% |

8) Two-aperture, 2-site, $M_{UL}$=5 dB (for $R_{half}$ at each site), consider availability for data rate=$R_{half}$, where X=4.6 dB, Y=3 dB.

| Location | $M_{UL}$ | X | Y | Elev. Angle | Uplink Availability (no correlation, $\rho_{half,2,c} = \rho_{half,2}$; $\rho_{full,2,c} = \rho_{full,2}$) | Uplink Availability ($\rho_{half,2,c}$ = $\rho_{full,2,c}$ = 25%;) |
|---|---|---|---|---|---|---|
| NYC | 5 dB | 4.6 dB | 3 dB | 40° | 99.9997% | 99.979% |
| Miami, FL | 5 dB | 4.6 dB | 3 dB | 40° | 99.991% | 99.856% |
| Kuala Lumpur | 5 dB | 4.6 dB | 3 dB | 40° | 99.980% | 99.742% |

The table below summarizes the different cases.

| | Diversity Approach | Information Rate/total | Information Rate/site | TX power relative to GW config A (for each site) |
|---|---|---|---|---|
| Case 1 | None | Full Rate (ex: 500 Mb/s) | Only one site: Full rate (500 Mb/s) | Same |

-continued

| | Diversity Approach | Information Rate/total | Information Rate/site | TX power relative to GW config A (for each site) |
|---|---|---|---|---|
| 2 | Full | Full Rate (ex: 500 Mb/s) | Full rate (500 Mb/s) | Same |
| 3 | None | ½ Rate (ex: 250 Mb/s) | Only one site: ½ rate (250 Mb/s) | Same |
| 4 | Full | ½ Rate (ex: 250 Mb/s) | ½ rate (250 Mb/s) | Same |
| 5 | Soft | Full Rate (ex: 500 Mb/s) | ½ rate at both sites, always on (250 Mb/s) | ½ EIRP |
| 6 | Soft | ½ Rate (ex: 250 Mb/s) | Full rate (250 Mb/s) at one or other site (other site experiencing outage), or both sites at ½ rate (125 Mb/s at both sites) | ½ EIRP |
| 7 | Soft | Full Rate (ex: 500 Mb/s) | ½ rate at both sites, always on (250 Mb/s) | Same |
| 8 | Soft | ½ Rate (ex: 250 Mb/s) | Full rate (250 Mb/s) at one or other site (other site experiencing outage), or both sites at ½ rate (125 Mb/s at both sites) | Same |

Summarizing, the Uplink Availabilities . . .

| | | | Case # | | | | | |
|---|---|---|---|---|---|---|---|---|
| | | 1 | 3 | 2 | 4 | 5 | 6 | 7 | 8 |
| | | Single site (no diversity) | | Full Diversity | | Soft Diversity | | | |
| | City | Full rate | ½ rate | Full rate | ½ rate | Full rate (half power) | ½ rate (half power) | Full rate (full power) | ½ rate (full power) |
| No correlation between sites | NYC | 98.12% | 99.72% | 99.965% | 99.9992% | 99.089% | 99.9989% | 99.600% | 99.9997% |
| | Miami | 96.13% | 98.62% | 99.850% | 99.981% | 96.328% | 99.976% | 97.830% | 99.991% |
| | K.L. | 97.03% | 98.33% | 99.912% | 99.972% | 96.110% | 99.966% | 97.074% | 99.980% |
| Correlation between sites | NYC | N/A | N/A | 99.530% | 99.930% | 99.201% | 99.964% | 99.650% | 99.979% |
| | Miami | N/A | N/A | 99.033% | 99.655% | 96.757% | 99.786% | 98.091% | 99.856% |
| | K.L. | N/A | N/A | 99.258% | 99.583% | 96.563% | 99.677% | 97.420% | 99.742% |

(Correlation is defined as the probability that outage occurs at second site, given that first site is experiencing an outage—all cases assume this as 25% for purposes of comparison.)

At ½ rate, the full-diversity approach is only negligibly better than the soft diversity approach in the uncorrelated case and is actually worse when there is some correlation between the sites. High link availabilities exist even in places like Miami, Fla. and Kuala Lumpur, even if there is substantial correlation between rain events at the two diversity sites. Additionally, even with 3 dB larger EIRPs the overall gateway performance does not change significantly in the soft diversity case at ½ rate, emphasizing that most of the gain is from the site diversity, not the increase in power available per carrier.

Finally, there is a large amount of excess margin ($M_{UL}$) that would be required in a single site to achieve the same performance as the diversity cases. This is directly related to how much bigger a single aperture site would have to be with respect to EIRP to achieve the same availabilities. Using the ITU rain model, the increase in required $M_{UL}$ (or equivalently, in EIRP; that is, the amount above the 2 dB used in the earlier examples) for a single-site (no diversity) aperture is given below:

| | | Full Diversity | | Soft Diversity (using ½ power numbers) | |
|---|---|---|---|---|---|
| | City | Full rate | ½ rate | Full rate | ½ rate |
| No correlation between sites | NYC | 16.8 dB | 53.2 dB | 1.2 dB | 63.0 dB |
| | Miami | 24.3 dB | 53.0 dB | 0.2 dB | 67.5 dB |
| | K.L | 54.7 dB | 74.2 dB | −1.1 dB | 81.3 dB |
| Correlation between sites | NYC | 2.9 dB | 7.1 dB | 1.6 dB | 16.7 dB |
| | Miami | 6.8 dB | 10.5 dB | 0.6 dB | 20.2 dB |
| | K.L | 15.5 dB | 20.4 dB | −0.7 dB | 29.0 dB |

Notably, most of these amounts are unattainable without significantly increasing the size of the aperture antenna, if they are attainable at all.

It is to be noted that the invention is applicable to more than two apertures. Explanation has been limited to the case of two in order to simplify explanation and analysis. Further, improvements yielded by additional apertures (all at geographically separate sites) yield relatively marginal improvements with increase in the numbers of apertures.

It is further to be noted that the invention is applicable to user terminals (UTs) on the return link in a similar fashion to the forward link herein described. However, return links typically have much lower data rates so the economic benefits are not as evident.

The topology described herein is a star topology wherein a large amount of traffic is routed through a gateway. It should be understood that the invention may find application in mesh or other topologies without departing from the scope and spirit of the invention.

Finally, the nature of the signal relay through a satellite used in accordance with the invention is unimportant. The concept of the invention works equally well with transponder or regenerative satellite relays.

The invention has been explained with reference to specific embodiments. Other embodiments will be evident to those of ordinary skill in the art. For example, groups of user terminals may likewise be provided with gateway soft diversity capability to communicate via the satellite to the network. It is therefore not intended that this invention be limited, except as indicated by the appended claims.

What is claimed is:

1. A method for optimizing communication through a single gateway via a single satellite to other terrestrial locations in the presence of communication impairments, said method comprising:
   receiving data traffic at said single gateway, said data traffic being destined for one or more users via said single satellite;
   allocating gateway traffic capacity simultaneously between at least two geographically-separated interdependently operative apertures of said single gateway according to said communication impairments with said single satellite, each of said apertures simultaneously carrying traffic of said single gateway to said single satellite while always being limited to carrying less than all traffic of said gateway;
   analyzing uplink availability of each aperture based on current communication impairments via said single satellite;
   prioritizing communication to establish a user priority according to user; and
   assigning, to each user by said priority, selected available variable bandwidth according to link availability across said apertures; and
   transmitting allocated user traffic via each said aperture simultaneously as single gateway traffic.

2. The method according to claim 1 wherein said selected available bandwidth includes a range of different data rates according to said priority.

3. The method according to claim 1 wherein said analyzing, prioritizing and assigning is performed by a an IP router having full access to all network traffic directed to said gateway, said IP router being integrated with a gateway controller.

4. The method according to claim 1 wherein said analyzing, prioritizing and assigning is performed by a gateway controller having no direct access to network traffic directed to said gateway, and wherein data is communicated to the network without passing through the gateway controller such that there is a separate data connection to the network for each aperture.

5. The method according to claim 1 wherein said allocating step includes employing frequencies of non-contiguous channels in each of said respective apertures in order to permit use of higher transmission power.

6. The method according to claim 1 wherein said communications impairment is atmospheric weather.

7. A system for optimizing communication through a single gateway via a single satellite to other terrestrial locations in the presence of communication impairments comprising:
   at least two geographically-separated interdependently operative apertures in a single gateway;
   a control means coupled to said at least two apertures for allocating gateway traffic capacity of said single gateway simultaneously between both said apertures according to said communication impairments, each of said apertures simultaneously carrying traffic of said gateway with said single satellite while always being limited to carrying less than all traffic of said gateway, said controller for further analyzing uplink availability of each aperture, for prioritizing communication to establish a user priority according to user, and for assigning, to each user by said priority, selected available variable bandwidth according to uplink availability across said apertures; and
   a transmitter associated with each said aperture of said single gateway for transmitting allocated user traffic via each said aperture simultaneously as single gateway traffic.

8. The system according to claim 7 wherein said selected available bandwidth includes a range of different data rates according to said priority.

9. The system according to claim 7 wherein said control means comprises a an IP router having full access to all network traffic directed to said gateway, said IP router being integrated with a gateway controller.

10. The system according to claim 7 wherein said control means comprises a gateway controller having no direct access to network traffic directed to said gateway, and wherein data is communicated to the network without passing through the gateway controller such that there is a separate data connection to the network for each aperture.

11. The system according to claim 7 wherein said allocating step includes employing frequencies of non-contiguous channels in each of said respective apertures in order to permit use of higher transmission power.

12. The apparatus according to claim 7 wherein said communications impairment is atmospheric weather.

* * * * *